D. G. S. GOCHNAUER.

Horse Hay-Fork.

No. 86,831.

Patented Feb. 9, 1869.

Witnesses.

Inventor

D. G. S. GOCHNAUER, OF MULBERRY, PENNSYLVANIA.

Letters Patent No. 86,831, dated February 9, 1869.

IMPROVEMENT IN HORSE HAY-FORKS.

The Schedule referred to in these Letters Patent and making part of the same

*To all whom it may concern:*

Be it known that I, D. G. S. GOCHNAUER, of Mulberry, in the county of York, and in the State of Pennsylvania, have invented certain new and useful Improvements in Horse Hay-Forks; and do hereby declare that the following is a full, clear, and exact description thereof, reference being had to the accompanying drawings, and to the letters of reference marked thereon.

The nature of my invention consists in the construction and general arrangement of a "horse hay-fork," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1:
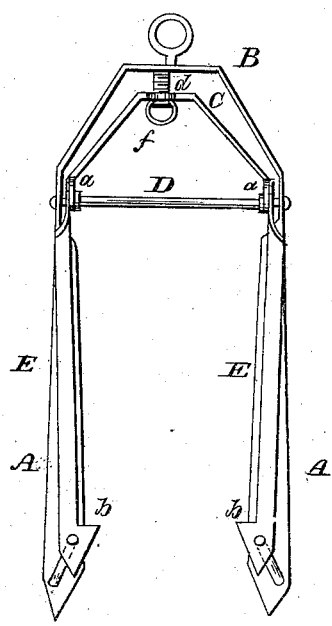
Figure 2:
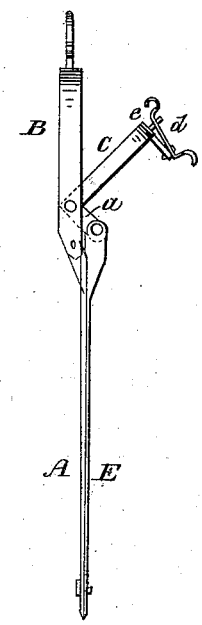

Figure 1 is a front elevation, and
Figure 2, a side view.

A A represent the two tines, which are connected, at their upper ends, by a bent bar, B, which forms the handle of the fork.

Another bent bar, C, is pivoted on a rod, D, at a suitable point in the handle B, said rod extending across the fork, as seen in fig. 1.

The lower ends of the bar C are provided with arms, *a a*, to the outer ends of which the sliding tines E E are pivoted.

The lower ends of the tines A A are pointed, and are provided with oblique slots, as shown in fig. 1.

The lower ends of the sliding tines E E form hooks, *b b*, on their inner side, and are attached to the tines A A by bolts, which pass through the slots mentioned.

When the bar, or lever, C, is turned down, these bolts slide to the lowest corner of the oblique slots, so that the fork may easily enter the hay; but, when the lever is raised, the tines E E move upward, the bolts in the slots carrying them inward, so that the hooks *b b* project on the inside of the fork.

On top of the lever C is a spring, *d*, which catches under the handle B, and holds the lever up.

A bolt, *e*, which passes through the lever, connects the spring with a ring, *f*, to which the trip-rope is attached, so that, by pulling on this rope, the spring *d* is depressed, allowing the lever C to turn down, which forces the hooks *b b* downward and outward, allowing the hay to drop.

Having thus fully described my invention,

What I claim as new, and desire to secure by Letters Patent, is—

The combination of the tines A A, tines E E, bar D, handle B, lever C, and its arms *a a*, spring *d*, and trip-bolt *e*, all substantially as and for the purposes set forth.

In testimony that I claim the foregoing, I have hereunto set my hand, this 21st day of January, 1869.

D. G. S. GOCHNAUER.

Witnesses:
LEOPOLD EVERT,
A. A. YEATMAN.